United States Patent [19]

Honda et al.

[11] Patent Number: 5,699,470
[45] Date of Patent: Dec. 16, 1997

[54] APPARATUS FOR RECORDING AND REPRODUCING VIDEO SIGNALS WITH RECORDING OF FREQUENCY CONVERTED SUBSAMPLED CHROMINANCE SIGNALS

[75] Inventors: Takashi Honda; Dai Sato, both of Kanagawa, Japan

[73] Assignee: Sony Corporation, Tokyo, Japan

[21] Appl. No.: 983,734

[22] Filed: Dec. 1, 1992

[30] Foreign Application Priority Data

Dec. 16, 1991 [JP] Japan ................................. 3-332119
Dec. 25, 1991 [JP] Japan ................................. 3-357321
Dec. 27, 1991 [JP] Japan ................................. 3-360509

[51] Int. Cl.$^6$ ............................................. H04N 9/79
[52] U.S. Cl. ........................ 386/27; 386/33; 348/392
[58] Field of Search ........................ 358/310, 330, 358/138, 40, 13, 320, 323; 386/26, 27, 33; 348/392, 424, 425; H04N 9/79, 9/64, 7/12, 9/89

[56] References Cited

U.S. PATENT DOCUMENTS

| | | |
|---|---|---|
| 4,692,801 | 9/1987 | Ninomiya et al. . |
| 4,709,275 | 11/1987 | Fukuda .................. 358/330 |
| 4,757,390 | 7/1988 | Mehrgardt et al. ........ 358/310 |
| 4,772,961 | 9/1988 | Ichinoi . |
| 4,922,342 | 5/1990 | Fonsalas et al. . |
| 4,982,279 | 1/1991 | Ishii et al. .............. 358/160 |
| 5,043,798 | 8/1991 | Emori .................... 358/138 |
| 5,049,994 | 9/1991 | Nakamura ................ 358/140 |
| 5,140,427 | 8/1992 | Nakane et al. ........... 358/231 |
| 5,200,834 | 4/1993 | Iwaibana et al. ......... 358/310 |

FOREIGN PATENT DOCUMENTS

| | | |
|---|---|---|
| 0 286 157 | 10/1988 | European Pat. Off. . |
| 0369756 | 5/1990 | European Pat. Off. ....... H04N 9/79 |
| 2194793 | 8/1990 | Japan ...................... H04N 9/79 |

OTHER PUBLICATIONS

IEICE Transactions vol. E-72, No. 4, 30 Apr. 1989, Tokyo JP pp. 324-325, XP000046974 M. Kobayashi et al. 'Chrominance Bandwidth Expansion of Color-under VCR'.

*Primary Examiner*—Thai Tran
*Attorney, Agent, or Firm*—William S. Frommer; Alvin Sinderbrand

[57] ABSTRACT

In an apparatus for processing an input video signal that includes a chrominance signal and a luminance signal, the luminance signal is frequency-modulated and the chrominance signal is subsampled, preferably by field-offset subsampling, whereupon, the subsampled chrominance signal is frequency-converted to a lower frequency band than the frequency band of the frequency-modulated luminance signal. The frequency-modulated luminance signal and the frequency-converted subsampled chrominance signal are then combined and the resulting combined signal is recorded on a recording medium such as a magnetic tape. During reproduction of the recorded signal, interpolation among frames is used to reconstruct the chrominance signal. Recording of the frequency-converted subsampled chrominance signal allows for space-efficient recording of the video signal while providing a reproduced chrominance signal that has a relatively wide bandwidth, thereby permitting improved color reproducibility.

9 Claims, 17 Drawing Sheets

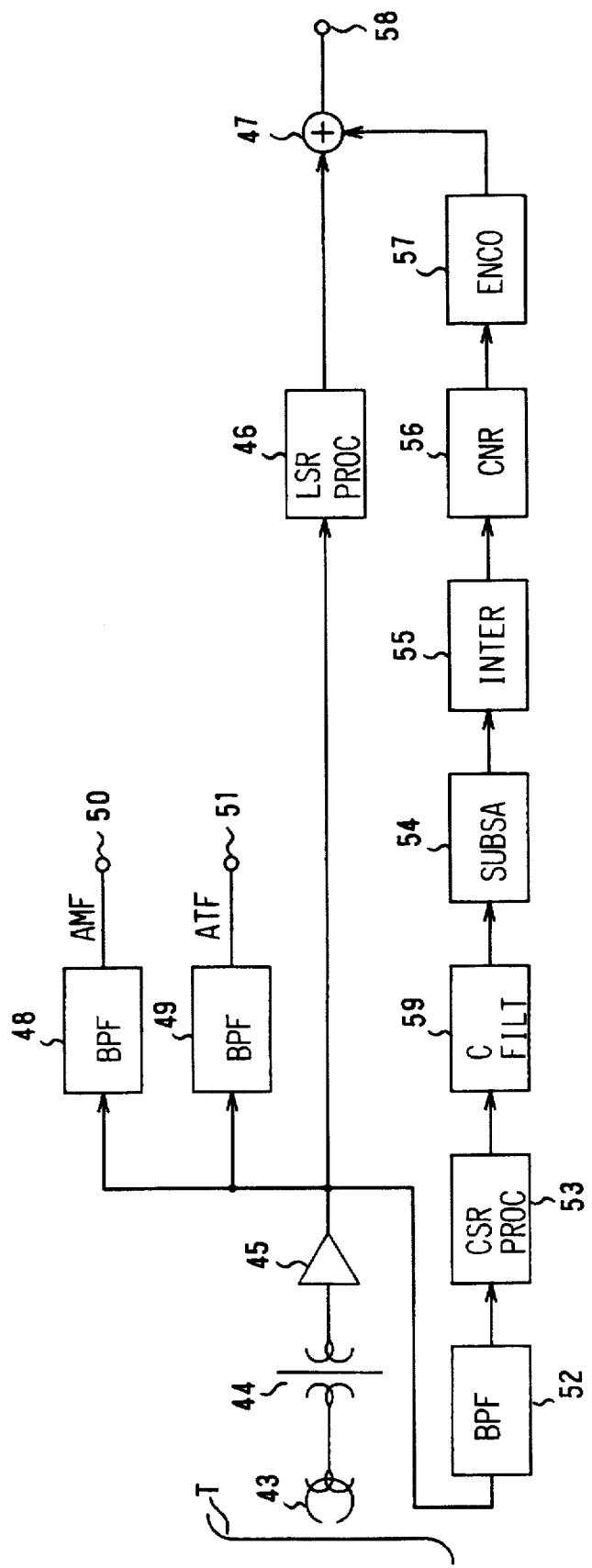
F I G. 8

ODD-NUMBERED FIELDS

EVEN-NUMBERED FIELDS

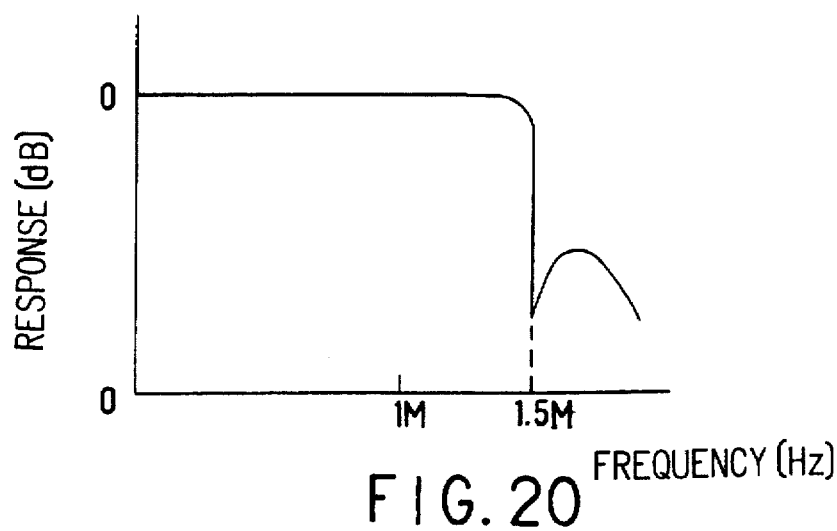
F I G. 20
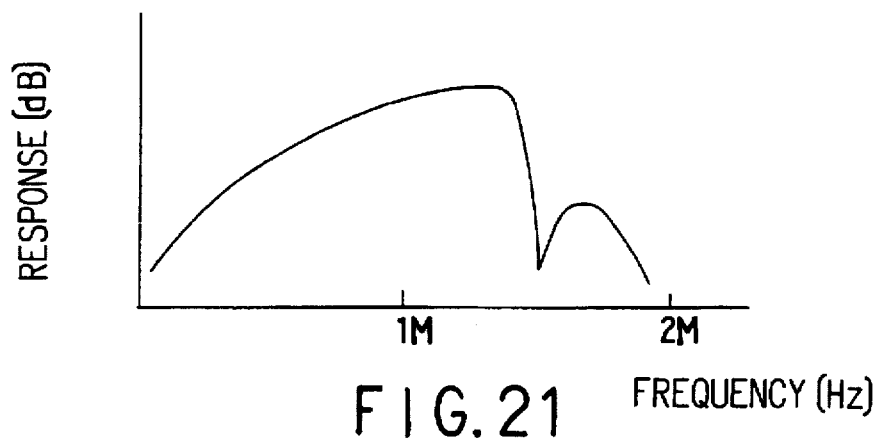
F I G. 21
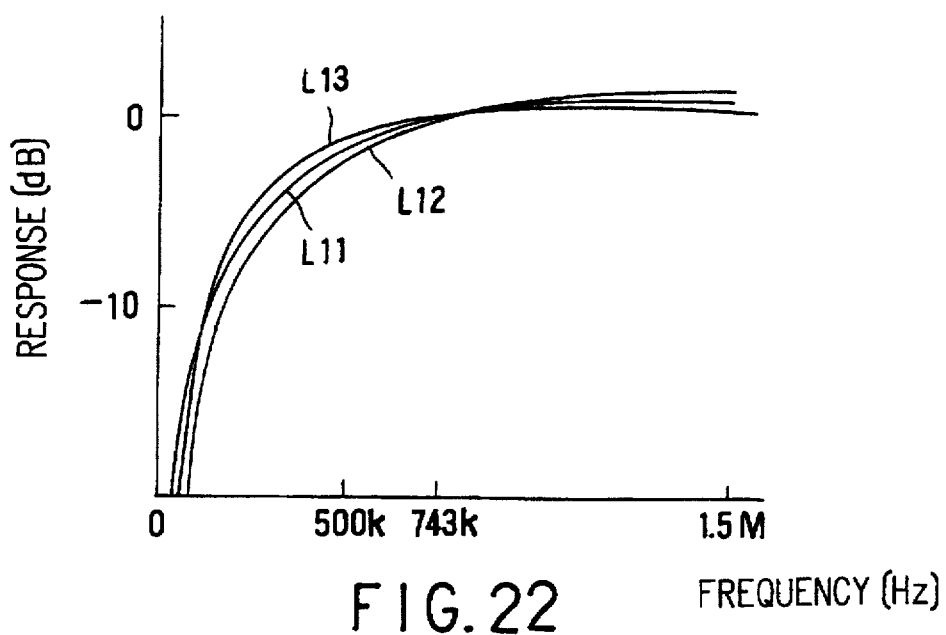
F I G. 22

5,699,470

1

APPARATUS FOR RECORDING AND REPRODUCING VIDEO SIGNALS WITH RECORDING OF FREQUENCY CONVERTED SUBSAMPLED CHROMINANCE SIGNALS

BACKGROUND OF THE INVENTION

1. Field of the Invention

This invention relates to video signal recording and reproducing apparatus, and, more particularly, to such apparatus in which a down-converted chrominance signal is recorded with a frequency-modulated luminance signal.

2. Related Background Art

In video tape recorders (VTRs) designed for consumer applications, it is well known to record down-converted chrominance signal components together with frequency-modulated (FM) luminance signals in order to minimize the tape area required for recording, and thereby increase the recording capacity of the tape cassette. According to this known approach, the chrominance signals are converted to a frequency band having a center frequency of about, for example, 700 kHz and a bandwidth of around 400–500 kHz.

A VTR of this conventional type is generally indicated by reference numeral 1 in FIG. 1.

In VTR 1, input video signals SV are supplied to an automatic gain control (AGC) circuit 2, which corrects the signal level of the input video signal SV. The level-corrected signal output by AGC circuit 2 is provided to luminance/chrominance signal separating (Y/C) circuit 3 which separates the signal into a luminance signal Y and chrominance signals C. The separated luminance signal Y is frequency-modulated by luminance signal processing circuit 4 to produce a luminance recording signal YFM.

Meanwhile, the chrominance signals C are supplied to an automatic chrominance control (ACC) circuit 6 through a bandpass filter (BPF) 5. The ACC circuit 6 outputs level-corrected chrominance signals C to an emphasis circuit 7, which emphasizes the chrominance signals C and outputs the emphasized chrominance signals to frequency conversion circuit 8. Conversion circuit 8 down-converts the chrominance signals C to the relatively narrow low frequency band previously described and the down-converted chrominance signals are output through low-pass filter (LPF) 9 to an adder circuit 10. Adder 10 combines the down-converted chrominance signals C with the luminance recording signal YFM and tracking control pilot signals ATF and outputs the combined signal through an amplifier 11 to a magnetic head 12. Magnetic head 12 records the processed video signals according to a well-known format in sequential oblique recording tracks on a magnetic tape T.

Turning now to the reproducing circuitry of VTR 1, a magnetic head 13 reproduces a signal that has been recorded on tape T and the signal output by magnetic head 13 is amplified by an amplifier 14.

Frequency-modulated luminance signals YFM present in the amplified signal output by amplifier 14 are demodulated by a luminance signal processing circuit 15. In addition, the output signal of amplifier 14 is supplied to low-pass filter 16, which extracts the chrominance signal components therefrom and simultaneously performs a phase correction. The signal output by LPF 16 is provided to automatic chrominance control (ACC) circuit 17 for level correction, and the resulting signal is provided to frequency conversion circuit 18, which re-converts the chrominance signals to their original frequency band, thereby reversing the effect of the frequency conversion 8 of the recording circuitry.

2

The frequency-converted chrominance signals output by conversion circuit 18 are passed through band pass filter 19 and comb filter 20 to a de-emphasis circuit 21, which reverses the processing effected by emphasis circuit 7 and provides the resulting de-emphasized chrominance signals C to an adder 22 for combination with the demodulated luminance signal Y output by processing circuit 15. Adder 22 outputs the combined signal as a reproduced video signal SV.

Although recording of the down-converted chrominance signals allows for space-efficient recording, the down conversion carries the disadvantage of reducing the bandwidth of the chrominance signals, resulting in significantly greater deterioration of the reproduced chrominance signal components than is suffered by the reproduced luminance signal.

The luminance signal has generally been considered to be more important than the chrominance signals in terms of the quality of the reproduced picture. Accordingly, the bandwidth of the luminance signal has been increased in order to improve the picture. However, it is also desired that further improvement in the picture quality be obtained by improving the reproducibility of the chrominance signals.

One possible approach for improving the reproducibility of the chrominance signals would be to use a recording carrier frequency that is a somewhat higher than the conventional 700 kHz. However, changing the carrier frequency would cause incompatibility with conventional VTRs. Moreover, the extent to which the carrier frequency may be raised is limited by the need to avoid overlapping the recording band used for the frequency-modulated luminance signals. Therefore, even if the compatibility problem were disregarded, a significant improvement in the reproducibility of the chrominance signals cannot be achieved using this approach.

Another possible approach, in which the carrier frequency is not changed, is directed to the reproducing circuitry. According to this approach, the edges of the reproduced chrominance signals are emphasized. However, this approach brings only a partial improvement in picture quality and does not significantly extend the recording band, while carrying the disadvantage of reducing the signal-to-noise ratio.

OBJECTS AND SUMMARY OF THE INVENTION

Accordingly, it is an object of the present invention to provide a video signal recording and reproducing apparatus that has a wider chrominance signal bandwidth while maintaining compatibility with conventional VTRs.

In accordance with the present invention, an apparatus for processing an input video signal that includes a chrominance signal and a luminance signal comprises means for subsampling the chrominance signal, means for frequency modulating the luminance signal, means for frequency converting the subsampled chrominance signal to a lower frequency band than that of the frequency-modulated luminance signal, means for combining the frequency-modulated luminance signal and the frequency-converted subsampled chrominance signal to provide a combined signal, and means for recording the combined signal on a recording medium.

According to alternative aspects of the invention, the subsampling of the chrominance signal is performed in a 2-field or 4-field cycle with offsets between successive fields. According to another aspect of the invention, interpolation among fields is performed during signal reproduction to provide reproduced color difference signals.

In the foregoing apparatus according to this invention, a wider chrominance signal bandwidth is provided than in conventional VTRs, resulting in improved color reproducibility and picture quality.

The above, and other objects, features and advantages of the present invention will be apparent from the following detailed description thereof which is to be read in connection with the accompanying drawings.

BRIEF DESCRIPTION OF THE DRAWINGS

FIG. 8 is a block diagram of reproducing circuitry in accordance with another embodiment of the present invention;

FIG. 20 is a diagram of a frequency response characteristic curve of a trap filter for trapping audio signals;

FIG. 21 is a graph of a frequency response characteristic curve that shows an output chrominance signal of the trap circuit referred to in FIG. 20;

FIG. 22 is a graph of frequency response characteristic curves that illustrate scatter in an entire electromagnetic conversion system that includes the trap filter referred to in connection with FIG. 20;

DETAILED DESCRIPTION OF THE PREFERRED EMBODIMENTS

An embodiment in which the present invention is applied to the 8 mm video format will be described with reference to FIGS. 2–7. The recording circuitry of the embodiment is shown in FIG. 2 and the reproducing circuitry in FIG. 3.

Figure 2:
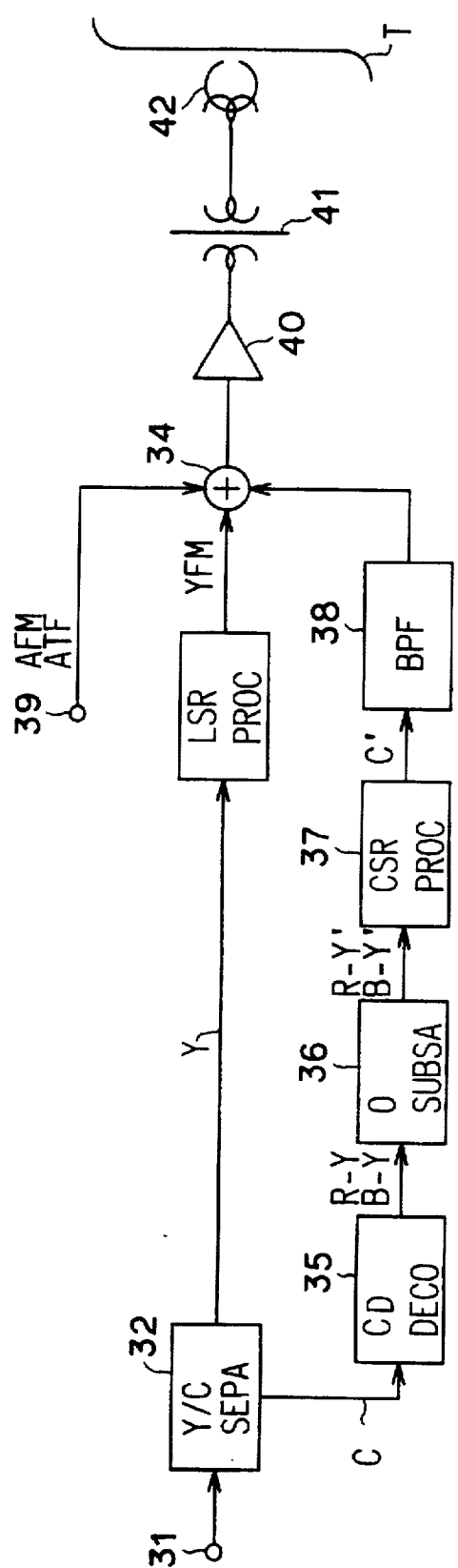
FIG. 2 is a block diagram of the recording circuitry of a VTR in accordance with an embodiment of the present invention.

Referring first to FIG. 2, the recording circuitry will be described.

A composite input video signal to be recorded is provided at input terminal 31. The signal received at input terminal 31 is supplied to a luminance/chrominance separating (Y/C) circuit 32. The separated luminance signal Y output by Y/C circuit 32 is supplied to a luminance record processing circuit 33, which effects recording processing such as frequency modulation and outputs a frequency-modulated luminance signal YFM to a mixer 34.

Further, chrominance signals C separated by Y/C circuit 32 are provided to a chrominance decoder 35, which outputs color difference signals R-Y and B-Y. The color difference signals R-Y and B-Y are supplied to an offset subsample circuit 36 which effects offset subsampling in a manner to be described below. The subsampled color difference signals R-Y' and B-Y' are provided to chrominance signal record processing circuit 37 which effects recording processing thereon. More specifically, the color difference signals R-Y' and B-Y'0 are encoded to form chrominance signals and are down-converted to a low frequency carrier at, in this embodiment, 743 kHz. The resulting down-converted chrominance signals, designated by the reference character C', are supplied to mixer 34 through bandpass filter 38 which eliminates folding noise contained in chrominance signals C'. The center frequency of the passband of BPF 38 is 743 kHz.

In addition to the down-converted chrominance signal C' and the frequency-modulated luminance signal YFM, mixer 34 is also supplied with frequency-modulated audio signals AFM and tracking pilot signals ATF which are obtained at an input terminal 39. By frequency multiplexing, the luminance signals YFM, chrominance signals C', audio signals AFM and tracking pilot signals ATF are all mixed by mixer 34. The resulting combined signal is supplied by way of a record amplifier 40 and a rotary transformer 41 to a rotary head 42 for recording on video tape T in a predetermined recording format.

Figure 3:
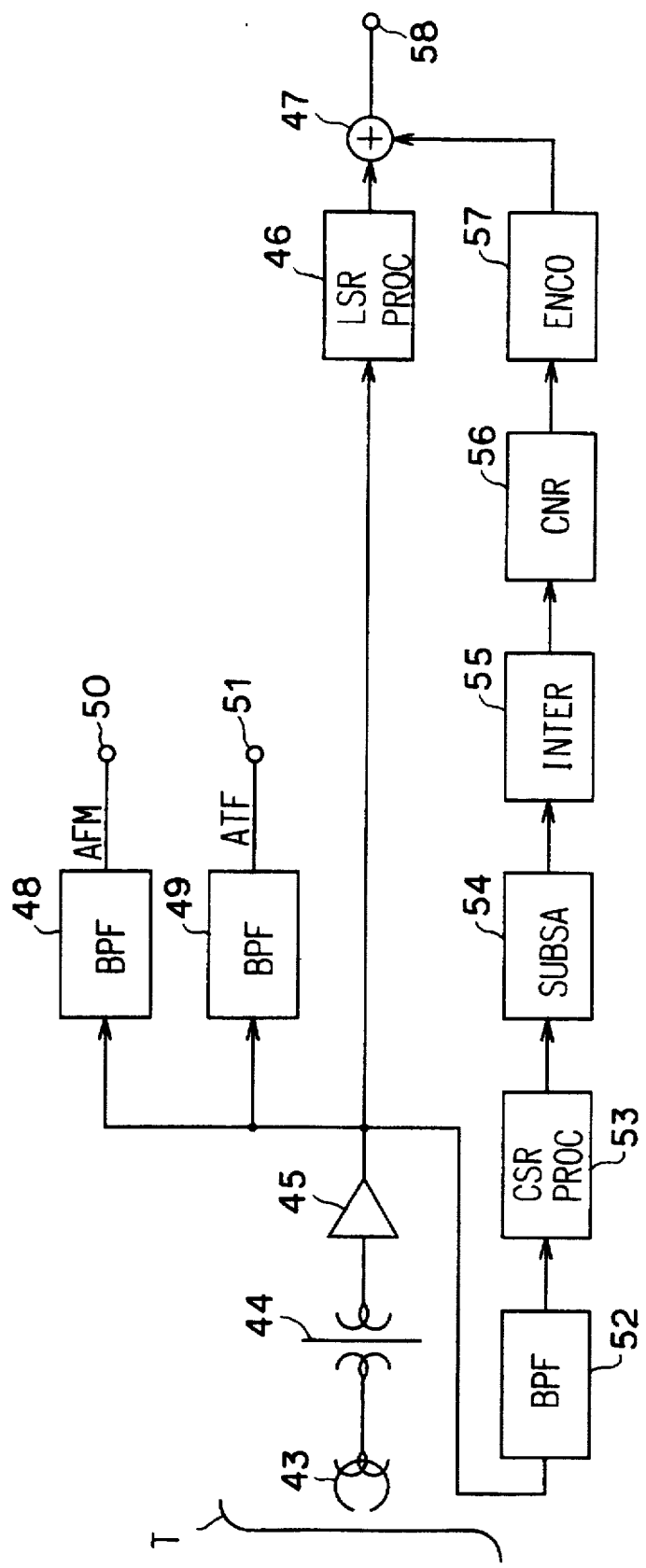
FIG. 3 is a block diagram of the reproducing circuitry of a VTR in accordance with an embodiment of the present invention.

The offset subsampling of the chrominance signal by offset subsample circuit 36 will now be explained with reference to FIGS. 4A–4D. In the embodiment of FIGS. 2 and 3, 4-field per cycle sampling is executed with an offset between fields of 90°. The sampling is performed using a sampling clock set to fsc/4, where fsc is the color subcarrier, i.e., 3.58 MHz. Thus, fsc/4=3.58÷4=895 kHz. The portions of the field that are sampled in accordance with the offset sampling method are shown in FIGS. 4A–4D for four sequential fields. Since interlace scanning is used, the spatial positions of the scan lines differ between odd-numbered and even-numbered fields. In the first field, shown in FIG. 4A, one in four sampling is performed in every line of the field. In adjacent lines the sampling is offset by 180° per line, in subsequent fields the sampling is offset by 90° per field, and in subsequent frames (each consisting of two fields) the offset is 180° per frame.

Figure 4A:
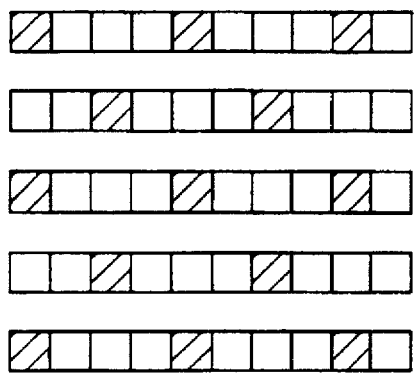
FIGS. 4A–4D schematically illustrate chrominance signal subsampling in the embodiment of FIGS. 2 and 3.
Figure 4B:
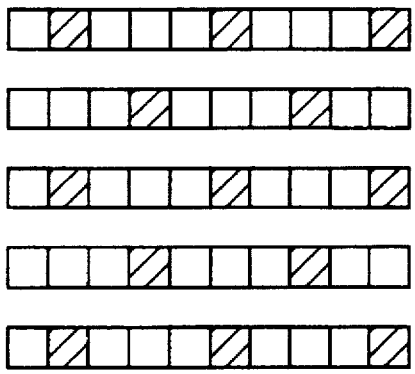
Figure 4C:
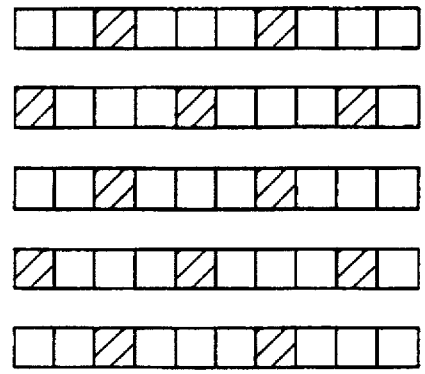
Figure 4D:
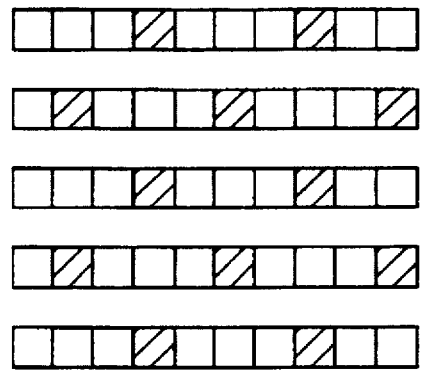

Accordingly, in the next field, i.e. the second field, which is shown in FIG. 4B, the one in four sampling is phase-shifted by 90° with respect to the first field. There is a further 90° phase shift in the third field, as shown in FIG. 4C, and still another 90° phase shift in the fourth field (FIG. 4D). The next, or fifth, field is sampled in the same manner as the first field shown in FIG. 4A. The sampling pattern repeats in cycles of four fields. A signal thinned out by the subsample circuit 36, in accordance with the offset subsampling process just illustrated, is provided through processing circuit 37 and bandpass filter 38 to mixer 34 for recording with the luminance, audio and tracking signals.

Reproducing circuitry, which reproduces video signals that were recorded in the manner described with respect to FIG. 2, will now be described with reference to FIG. 3. In FIG. 3, a rotary head 43 reproduces signals recorded on tape T and supplies the reproduced signals through a rotary transformer 44 and reproducing amplifier 45 to a luminance reproducing processing circuit 46. Processing circuit 46 detects frequency-modulated luminance signals YFM contained in the reproduced signal, demodulates the signals, and supplies demodulated luminance signals Y to a mixer 47.

In addition, the reproduced signal output by reproducing amplifier 45 is supplied to bandpass filters 48 and 49 which respectively provide the frequency-modulated audio signal AFM and the tracking pilot signal ATF to output terminals 50 and 51 by passing respective passbands corresponding to those signals.

The output signal of reproducing amplifier 45 is also supplied to a bandpass filter 52, which has a passband with a center frequency at 743 kHz for extracting the down-converted chrominance signals C'. The output of bandpass filter 52 is supplied to chrominance signal reproducing processing circuit 53 for conversion into baseband color difference signals R-Y' and B'-Y'. The resulting frequency-converted color difference signals R-Y' and B-Y' are supplied to a subsample circuit 54 for sampling at a sampling rate of fsc/4=895 kHz.

Then, the sampled color difference signals are supplied to an interpolating circuit 55 which interpolates the signals to provide color difference signals having a transmission band of fsc/2. Interpolating circuit 55 includes a frame memory and interpolates using four fields of color difference signals, which may, for example, be the four most recent fields or alternatively may include both prior and subsequent fields.

The interpolated color difference signals are supplied to a chrominance noise reducing (CNR) circuit 56 in which noise elimination is carried out. The resulting signal is then provided to an encoder 57 which outputs chrominance signals modulated with the 3.58 MHz color subcarrier. These signals are provided to mixer 47 for mixing with the luminance signals to obtain composite video signals. The composite video signals are then provided at an output terminal 58.

Details of the reproduction processing of the chrominance signals will now be discussed with reference to FIGS. 5 and 6.

Figures 5, 6:
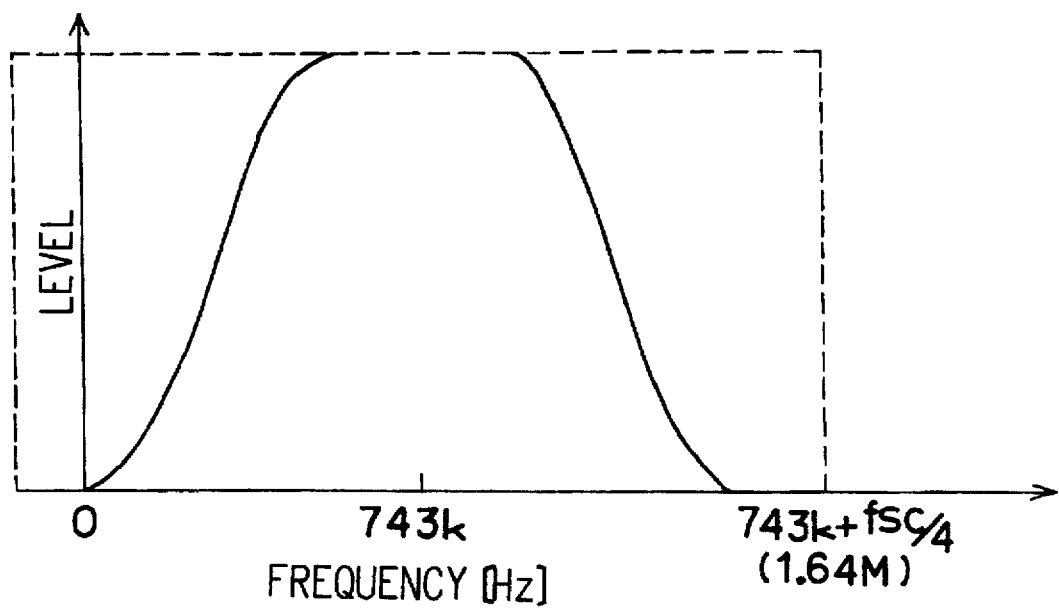
FIG. 5 schematically illustrates interpolation of reproduced chrominance signals in the embodiment of FIGS. 2 and 3.
FIG. 6 schematically illustrates the effective bandwidth of chrominance signals recorded and reproduced in accordance with the invention.

FIG. 5 shows an interpolation pattern used in interpolating circuit 55. The numerals 1, 2, 3 and 4 which appear in cells of FIG. 5 respectively correspond to the first, second, third and fourth fields subsampled by the subsampling method illustrated in FIGS. 4A–4D. The respective portions of the four fields are interpolated using the pattern shown in FIG. 5 to provide reproduced chrominance signals.

The resulting transmission rate of the reproduced chrominance signals is fsc/2 and the bandwidth, as shown in FIG. 6, is $f_{sc}+(f_{sc}/4)$ where f' is the 743 kHz low-frequency-conversion carrier. In effect, virtually the entire chrominance signal is reproduced.

A comparison of the bandwidth provided in a VTR according to the present invention with the bandwidth of the prior art system is provided in FIG. 6, in which the curve shown in a solid line represents the prior art frequency band which is determined by filter characteristics of a chrominance signal extraction filter and has a center frequency at 743 kHz. By contrast, in the frequency band provided according to the present invention, the band is flat up to 1.64 MHz $(=f'_{sc}+f_{sc}/4)$, and is indicated by the rectangle shown in broken lines in FIG. 6.

The flat frequency band extending up to the subsampling clock frequency can only be achieved if the overall transmission frequency response of the system from tape recording with subsampling through reproduction and interpolation is in the form of a symmetrical cosine roll-off. Such an overall transmission frequency response is graphically illustrated in FIG. 7, in which infinite attenuation is developed at f'+700 kHz.

It is to be noted that the effective frequency band provided by the system of the present invention is more than twice as large as the prior art band, which was only 400–500 kHz. In other words, the system of the present invention provides a much better frequency response for chrominance signals with a significant improvement in the reproducibility of color signals. At the same time, the chrominance signals as actually recorded have the same bandwidth and carrier frequency as those used in the conventional 8 mm system, so that a system according to this invention can easily reproduce signals tape-recorded on a conventional VTR. Further, there is no need to improve the capabilities of such components as the video tape, the recording and reproducing head, and so forth so that compatibility with conventional VTR's is also achieved in terms of components. Moreover, the improvement in the frequency response of the chrominance signal is complete, and not partial, so that the signal-to-noise ratio is not reduced.

Figure 9A:
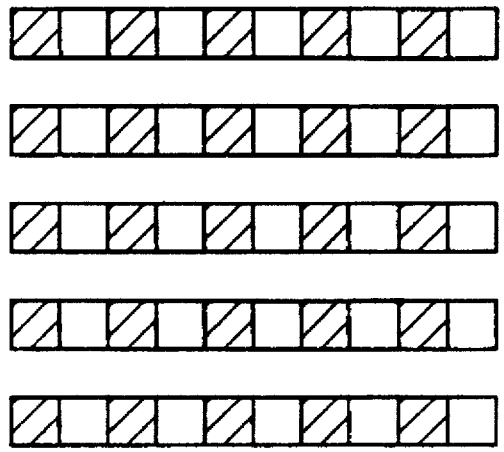
FIGS. 9A and 9B schematically illustrate chrominance signal subsampling used in recording a signal that is reproduced by the embodiment of FIG. 8.
Figure 9B:
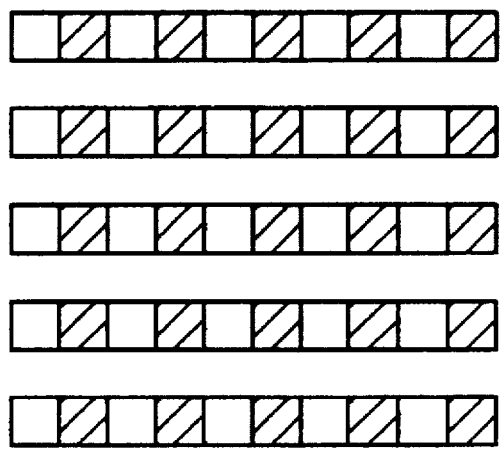

Another embodiment of the present invention will now be described with reference to FIGS. 8, 9A and 9B. Elements of FIG. 8 which correspond to those described with reference to FIG. 3 are identified by the same reference numerals and will not be described in detail. In the embodiment now being described, a different subsampling method is used than that used in the embodiment of FIGS. 2 and 3 and illustrated in FIGS. 4A–4B. Accordingly, in the present embodiment, the subsample circuit 36 (FIG. 2) executes a two-field cycle with an offset between fields of 180° as shown in FIGS. 9A and 9B. In other words, the subsampling phase is inverted between odd-numbered and even-numbered fields. In the odd-numbered fields, shown in FIG. 9A, one out of two subsampling is performed in each horizontal line, with no offset between lines of the same field. In the even-numbered fields, as shown in FIG. 9B, the phase of the subsampling is inverted with respect to the odd-numbered fields, but again there is no offset between lines in the same field.

In this manner, the subsampling is carried out with a 180° offset between fields, thereby making it possible, as will be described later, to substantially eliminate cross-talk between adjacent fields during reproduction.

The reproducing circuitry of FIG. 8, to the extent that it differs from that shown in FIG. 3, will now be described. In the circuitry of FIG. 8, the reproduced subsampled chrominance signals output by chrominance signal reproducing processing circuit 53 are supplied to a line comb filter 59, which removes noise from the signal using line correlation. Then the reproduced chrominance signals output from filter 59 are provided to subsample circuit 54 and, as before, subsampled at fsc/4. The subsampled chrominance signals output by subsample circuit 54 are interpolated in interpolating circuit 55, noise reduced at CNR circuit 56 and encoded at encoder 57 before being supplied to mixer 47 for combining with the demodulated luminance signal. The interpolation performed by interpolating circuit 55 in this embodiment utilizes a field memory in which the previous field is stored and samples are taken alternately from the present field and the previous field.

In the embodiment shown in FIG. 8, recorded cross-talk chrominance signals are eliminated by comb filter 59 so that the reproduced chrominance signals are not affected by cross-talk.

As is known to those skilled in the art, in a conventional consumer VTR the video signals are recorded in inclined tracks on the video tape, with signals for one field occupying each track. Each track is affected by cross-talk from adjacent tracks. Even when so-called azimuth recording is used to minimize cross-talk by recording and reproducing adjacent tracks with respective heads that have mutually different azimuth angles, the reduction in the cross-talk is not particularly effective with respect to the chrominance signals since these are recorded at a relatively low frequency. Therefore, it is known to remove cross-talk chrominance signals by adding a phase-inverted cross-talk signal.

By contrast, when, in accordance with the embodiment of this invention described with reference to FIG. 8, subsampled chrominance signals are recorded, there is no cross-talk in the chrominance signals from adjacent tracks because chrominance signals are not subsampled in corresponding positions in adjacent tracks (i.e., adjacent fields). Therefore, the conventional cross-talk cancellation cannot be properly performed. Consequently, in this embodiment, the cross-talk signals are removed by comb filter 59 since the cross-talk provided at any field sampling location is the same, and line correlation is used.

It is to be noted that the elimination of cross-talk signals by comb filter 59 does not affect the frequency response with respect to the extended frequency band provided by the subsampling process. In other words, just as in the former embodiment (shown in FIGS. 2 and 3), the chrominance signal band extends as shown by the broken line in FIG. 6.

Another advantage of the embodiment shown in FIG. 8, is that a single field memory is used for the interpolating process, since the subsampling phase is inverted between successive fields. Accordingly, less memory capacity is needed for interpolating in this embodiment than in the embodiment of FIG. 3. Also, since interpolation is performed using the field memory, follow-up of a moving picture is improved. More specifically, as was shown in FIG. 4, with 4-field cycle subsampling, as in the embodiment of FIG. 3, a picture that is up to three fields old influences the chrominance signals. However, in the embodiment of FIG. 8, only the immediately preceding field influences the chrominance signals. Since changes in color in the reproduced picture almost completely follow motion in the picture, the so-called "tailing" effect is prevented.

In the embodiment as shown in FIG. 8, cross-talk is eliminated by the comb filter 59 before interpolation, but as an alternative, the comb filter may be arranged after the interpolating circuit.

Thus, in both of the embodiments of the present invention described above, offset-subsampled chrominance signals are recorded and the chrominance signals are restored by interpolation during reproduction. As a result, chrominance signals having a frequency band several times wider than in the prior art can be recorded and reproduced, while using the conventional recording frequency band.

Also, cross-talk signals can be substantially removed by appropriate selection of the offset cycle used for subsampling during recording.

Figure 1:
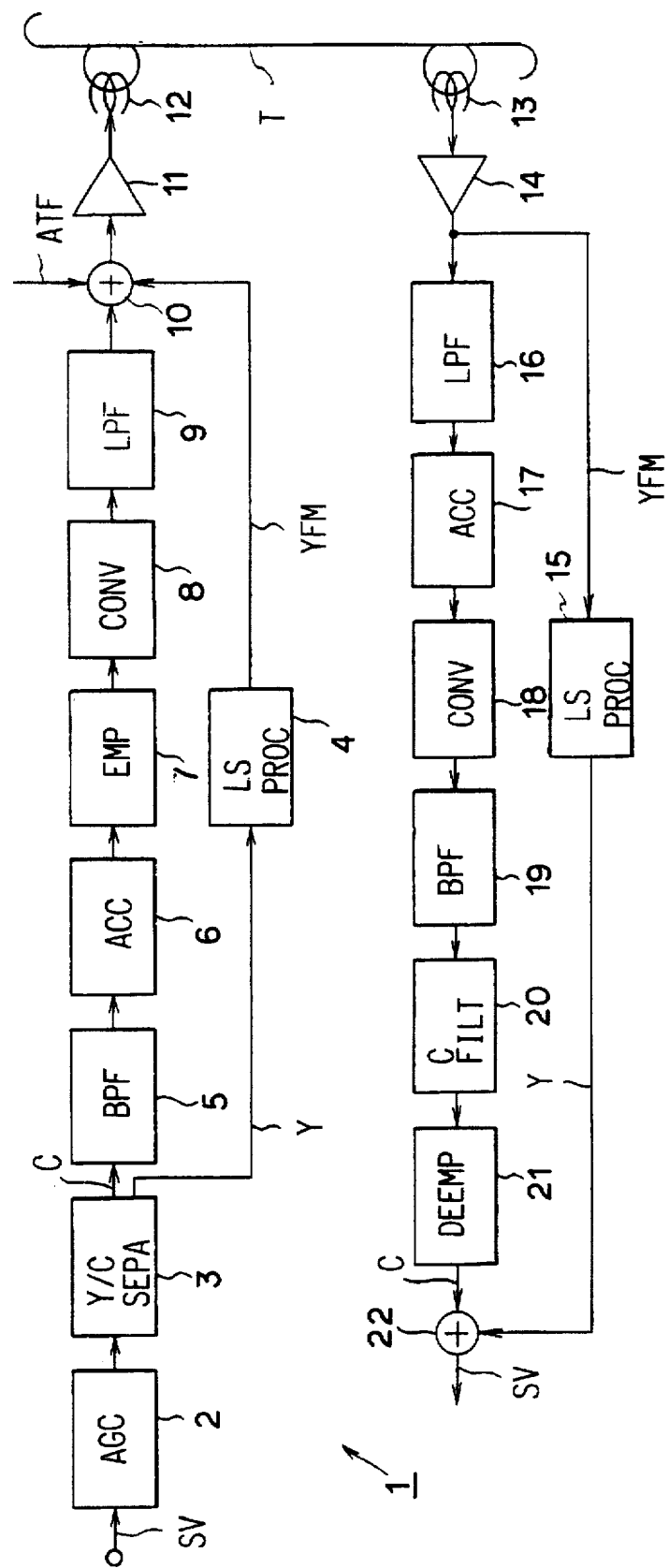
FIG. 1 is a block diagram of a conventional video tape recorder.

A third embodiment of the present invention will now be described with reference to FIG. 10, in which elements corresponding to those of FIG. 1 are identified by the same reference numerals.

Figure 10:
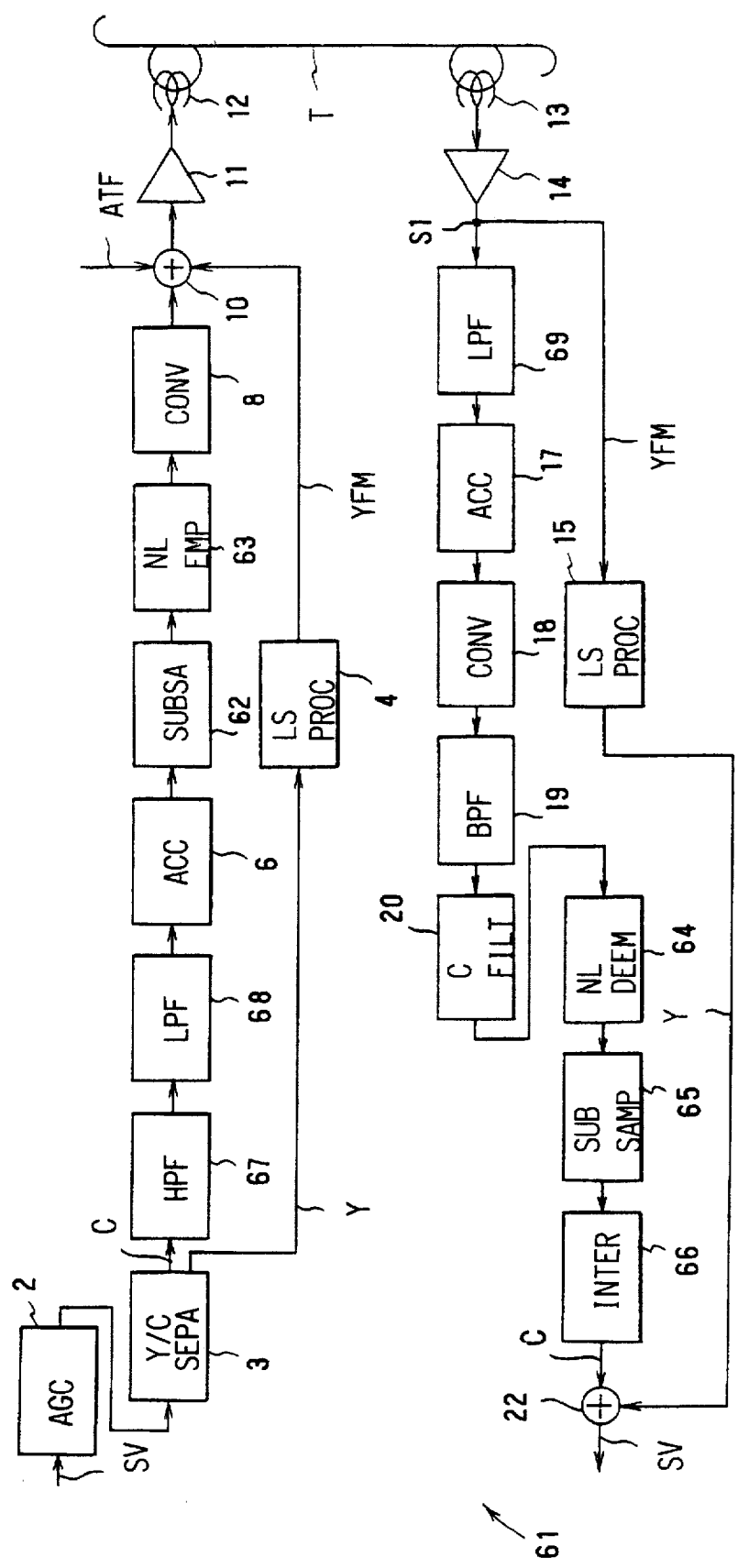
FIG. 10 is a block diagram of a video tape recorder according to still another embodiment of the present invention.

In FIG. 10, reference numeral 61 generally indicates a video tape recorder. In VTR 61, a subsample circuit 62 and a non-linear emphasis circuit 63 are arranged in place of the emphasis circuit 7 of FIG. 1, and chrominance signals C are subsampled by subsample circuit 62 in order to perform band-compression. Then, a non-linear emphasis circuit 63 performs a non-linear emphasis process in order to prevent deterioration of the quality of the reproduced picture.

On the other hand, the reproducing circuitry of VTR 61 has a non-linear de-emphasis circuit 64, a subsample circuit 65 and an interpolating circuit 66 in place of the de-emphasis circuit 21 of FIG. 1. It will be appreciated that non-linear de-emphasis circuit 64, subsample circuit 65 and interpolating circuit 66 together reverse the effects of subsample circuit 62 and non-linear emphasis circuit 63 and extend the frequency band of the reproduced chrominance signals so that the original chrominance signals are provided.

Figure 7:
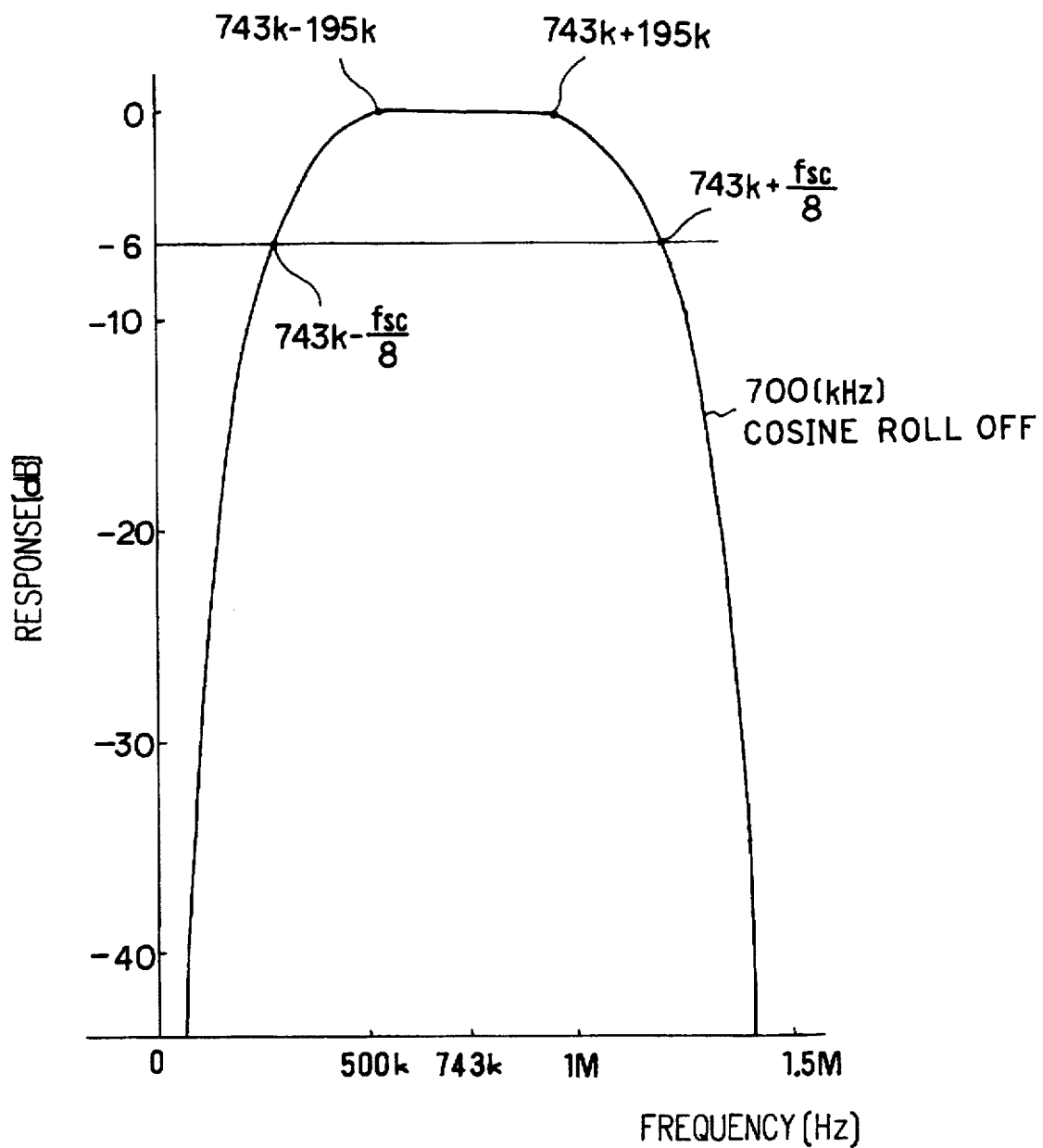
FIG. 7 graphically illustrates a frequency response characteristic curve having a cosine roll-off.

As briefly mentioned before, when a subsampled chrominance signal is recorded and then reproduced in the manner described above, it is necessary that the frequency response characteristic of the entire recording and reproducing system have the form of a cosine roll-off. In particular, in order to have a cosine roll-off frequency response characteristic while maintaining compatibility with the conventional 8 mm format, the characteristic curve, as shown in FIG. 7, has a center frequency of 743 kHz and must exhibit substantially infinite attenuation at ±700 kHz from the center frequency.

Figure 11:
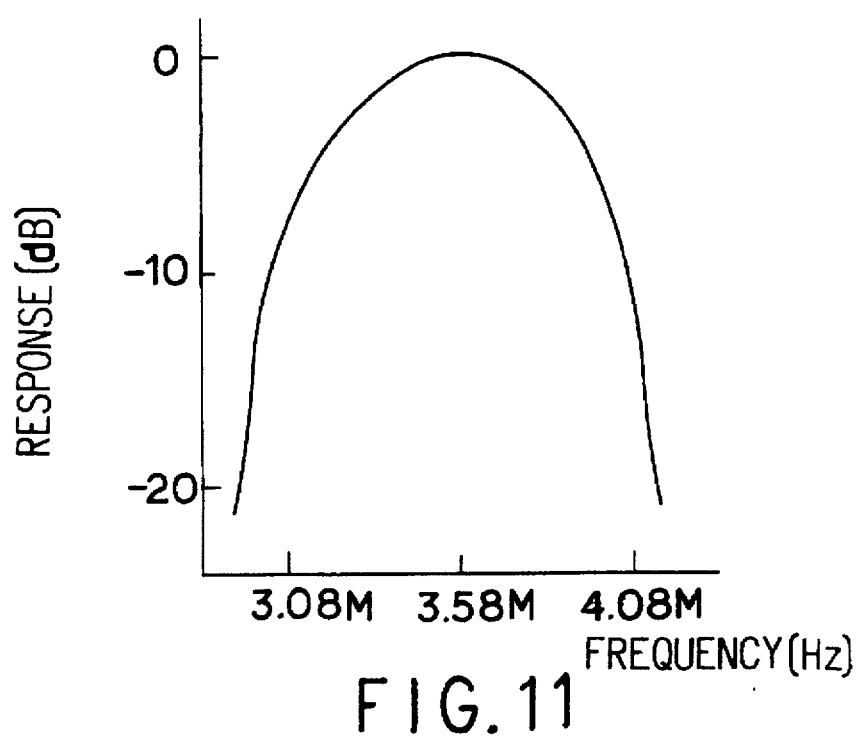
FIG. 11 is a graph of a conventional frequency band used for chrominance signals.

However, in the conventional VTR 1 as shown in FIG. 1, the chrominance signal band is restricted in order to prevent interference with the pilot signals that are used for tracking control and the frequency modulated audio signals. Therefore, as shown in FIG. 11, a frequency band extending 500 kHz above and below the carrier frequency (3.58 MHz) is actually allocated to the chrominance signals. As a result, if a filter circuit such as that used in prior art video tape recorder 1 is provided in the VTRs according to the present invention, it is difficult to achieve the required cosine roll-off.

Figure 12:
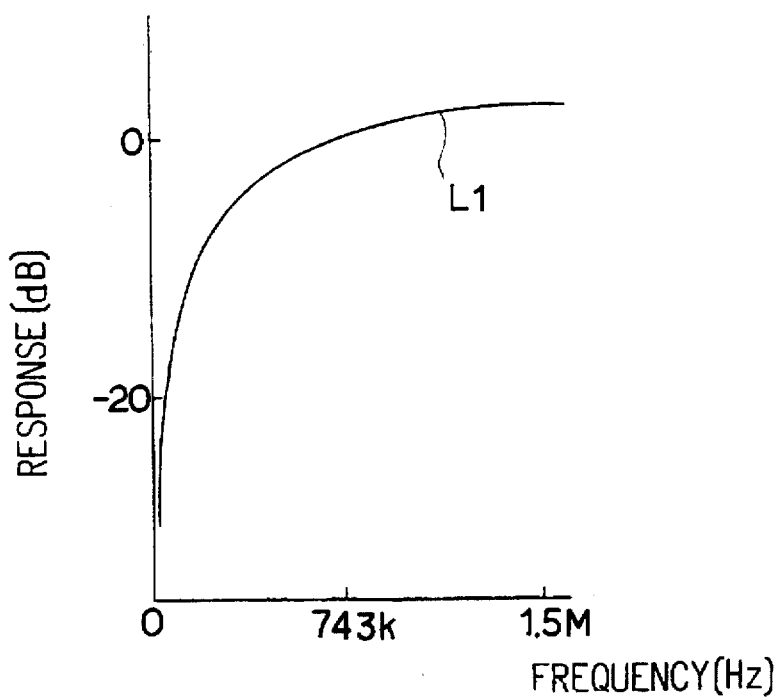
FIG. 12 is a graph of a frequency response characteristic curve for a VTR's electromagnetic conversion system.

Moreover, as shown by curve L1 in FIG. 12, the frequency response characteristic of the electromagnetic conversion system itself decreases at 6 dB per octave on the low frequency side. It is therefore necessary to correct the frequency response of the electromagnetic conversion system in order to achieve the required cosine roll-off using a conventional filter circuit.

Figure 13:
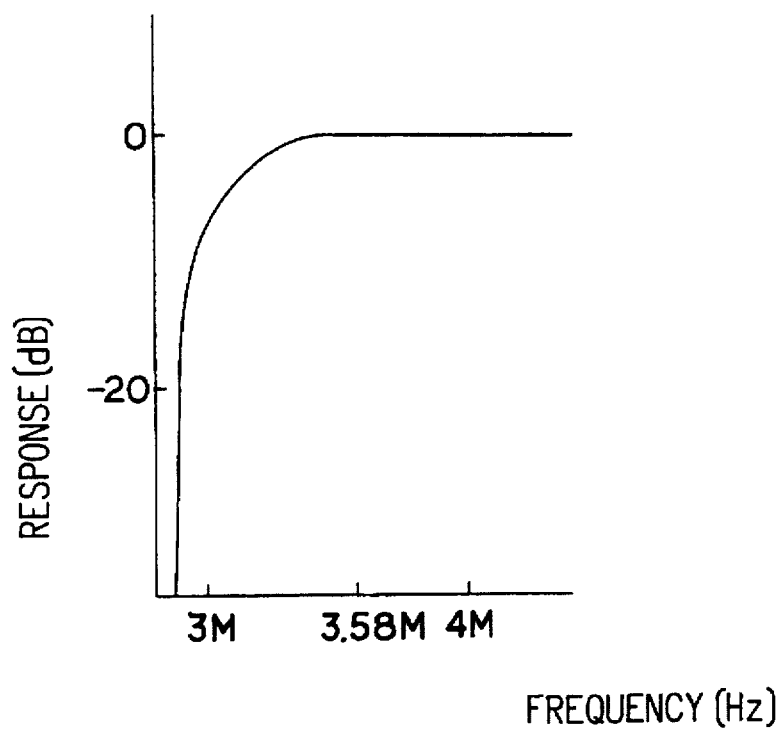
FIG. 13 is a graph of a frequency response characteristic curve for a high-pass filter.
Figure 14:
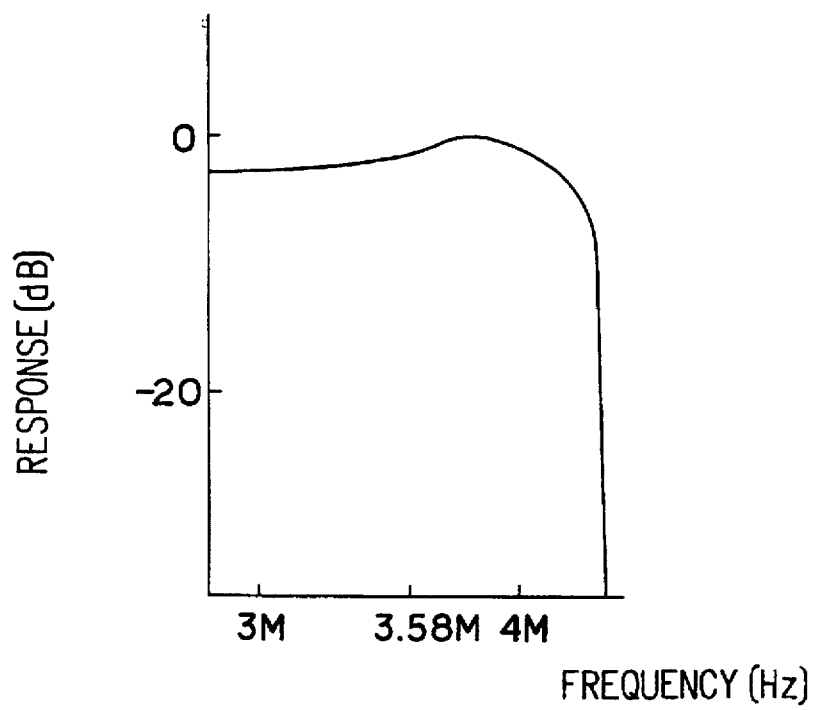
FIG. 14 is a graph of a frequency response characteristic curve for a low-pass filter that is part of a recording circuit.

For this reason, VTR 61 of FIG. 10 does not include the low-pass filter 9 of the VTR 1 of FIG. 1. Instead, a high-pass filter 67 and a low-pass filter 68 are provided in FIG. 10 in place of the bandpass filter 5 of VTR 1 (FIG. 1). The respective frequency response characteristics of HPF 67 and LPF 68 are shown in FIGS. 13 and 14 and together establish the frequency response characteristic of the recording circuitry of VTR 61.

Figure 15:
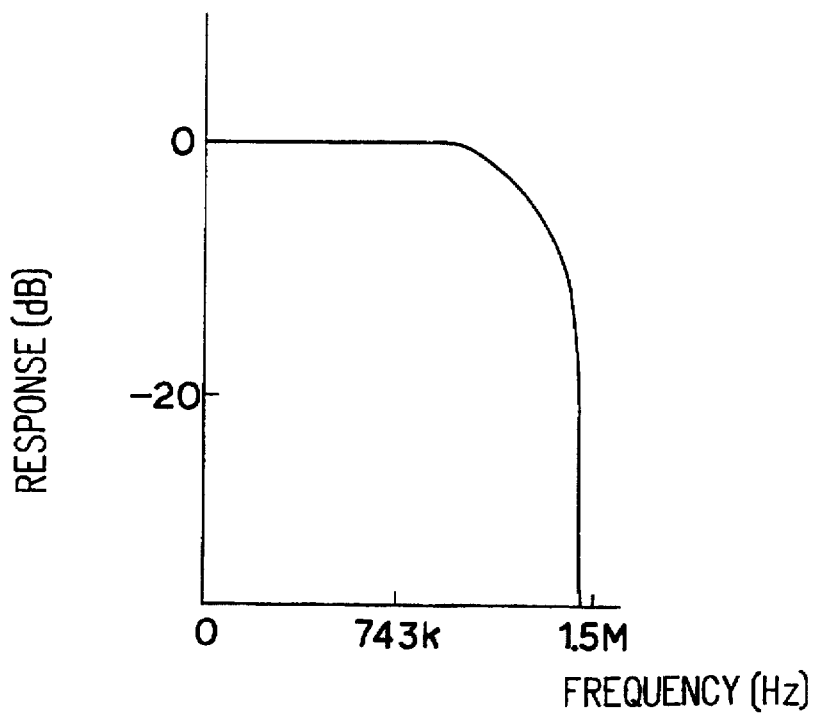
FIG. 15 is a graph of a frequency response characteristic curve for a low-pass filter in a reproducing circuit.

In addition, in the reproducing circuitry of VTR 61, a low pass filter 69 that has a characteristic as shown in FIG. 15 is provided in place of the low-pass filter 16 of VTR 1 (FIG. 1). In other words, in conventional VTR 1, chrominance signals C are separated from luminance signals Y by using a bandpass filter and the down-converted chrominance signals are output through a low pass filter that restricts the transmitted frequency band. Also, in the reproducing circuitry of VTR 1, extraction of the chrominance signals is performed by suppressing signals in bands outside the chrominance signal band.

On the other hand, in VTR 61 of FIG. 10, the filter circuits are configured to provide the desired cosine roll-off characteristic in the entire recording and reproducing system.

Figure 16A:
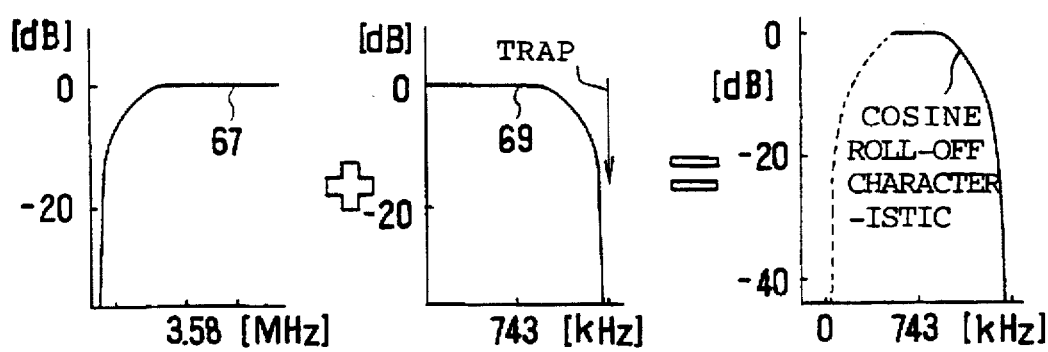
FIGS. 16A and 16B are graphs of frequency response characteristic curves for illustrating construction of a filter circuit in accordance with the invention.

More specifically, in VTR 61 the desired cosine roll-off on the high frequency side is achieved by taking advantage of the characteristics of HPF 67 in the recording circuit and LPF 69 in the reproducing circuit as shown in FIG. 16A. The LPF 69 acts to attenuate or "trap" the frequency modulated audio signals recorded with the chrominance signal.

Figure 16B:
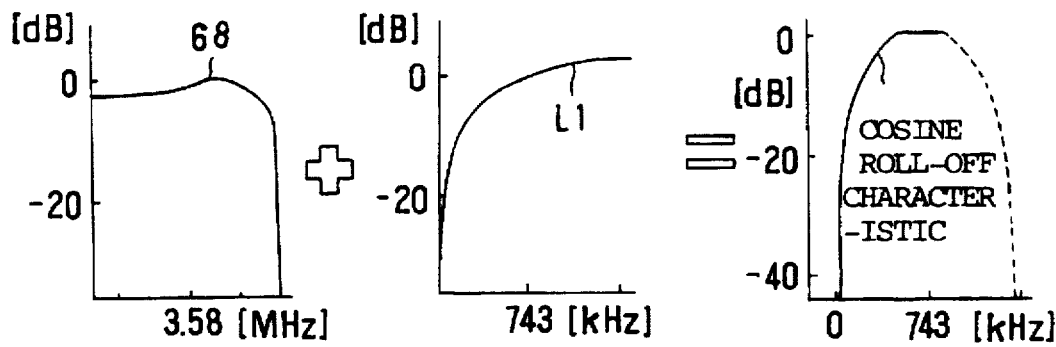

On the low frequency side, the desired cosine roll-off is achieved by virtue of the response characteristics of the electromagnetic conversion system and LPF 68 which is in the recording system (FIG. 16B). The cosine roll-off on the high frequency side is not influenced by the electromagnetic conversion system.

Figure 17:
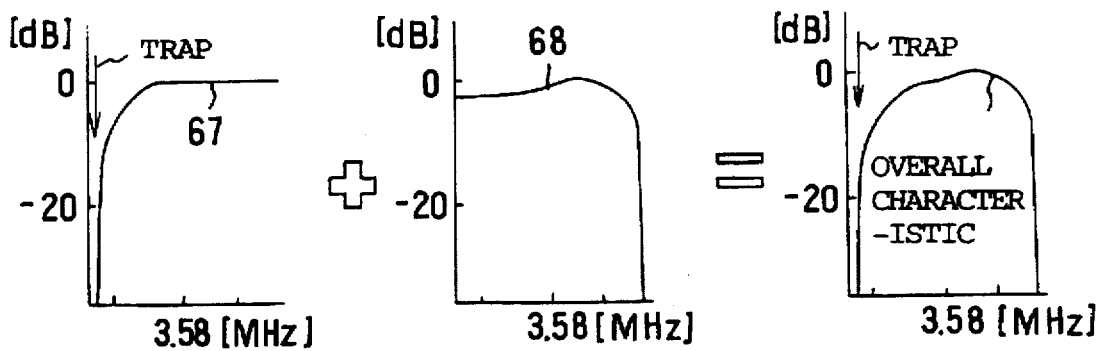
FIG. 17 is a graphical illustration of a frequency response characteristic curve for an entire recording system.

The frequency response characteristics of the recording system are illustrated in FIG. 17 and reflect the characteristics of the filters included in the recording circuitry as previously described. In VTR 61, the function of the conventional BPF 5 of FIG. 1 is provided through the combined characteristics of HPF 67 and LPF 68. At the same time, HPF 67 provides the trapping of the frequency-modulated audio signals that was performed by the LPF 9 of VTR 1.

Further, in the reproducing circuit of VTR 61, LPF 69 performs the trapping of frequency-modulated audio signals that was provided by the conventional LPF 16 of VTR 1. Compatibility with the frequency band of the conventional VTR format can therefore be maintained.

Incidentally, in the embodiment of FIG. 10, the trap for the tracking pilot signals ATF is omitted. However, testing has shown that tracking can still be performed even by omitting the trap filter, so that the omission of this trap filter does not make the embodiment impractical.

It should also be noted that BPF 19 of FIG. 10 is the same as BPF 19 of FIG. 1 and has a broad passband that does not affect the frequency characteristic of the system as a whole. BPF 19 is arranged so that the group delay characteristic is flat within the passband, as is also the case with filters 67, 68 and 69.

With the recording and reproducing circuitry as described with respect to FIG. 10, the filters are arranged to compensate for the frequency characteristic of the electromagnetic conversion system so that the required cosine roll-off is achieved. It is therefore possible to record and reproduce subsampled chrominance signals in order to improve the quality of the picture.

Another embodiment of the present invention will be described with reference to FIG. 18, in which elements corresponding to those of FIG. 1 are identified by the same reference numerals. Thus, in FIG. 18, a VTR, generally indicated by reference numeral 71, converts chrominance signals C into color difference signals U and V. More specifically, in VTR 71, a color difference signal converting circuit 72 converts the chrominance signal C into color difference signals U and V and supplies the signals to a subsample circuit 73. Band compression is accomplished in circuit 73 by offset subsampling as previously described. The subsampled signals output by subsample circuit 73 are provided via a bandpass filter 74 to a chrominance signal recording processing circuit 75. Processing circuit 75 down-converts the signals and provides the down-converted signals via low-pass filter 76 to mixer 10. In this way, the chrominance signals are band-compressed for recording down to the frequency band used in the conventional format.

In the reproducing circuit of VTR 71, reproduced signals S1 provided by magnetic head 13 are amplified by an amplifier 14. An automatic track following (ATF) circuit 77 detects tracking control pilot signals that are present in the amplified signal provided by amplifier 14 and generates a tracking error signal on the basis of which tracking control is performed.

Reproduced chrominance signals that are also present in the amplified signal provided by amplifier 14 are extracted by a reproduced chrominance signal processing circuit 79, which receives the signals from amplifier 14 through a low-pass filter 78. The extracted signals are converted into color difference signals U and V and then output through a bandpass filter 80 to a subsample circuit 81. At subsample circuit 81 the color difference signals U and V are subsampled and the subsampled signals are then interpolated by an interpolating circuit 82 using the preceding or following line color difference signals U and V, thereby restoring the picture information that was thinned out by subsample circuit 81. A comb filter 83 receives the signal output by interpolating circuit 82 and corrects the frequency characteristic of those signals while also suppressing noise components resulting from the use of the field memory in interpolating circuit 82. Then the signals output by comb filter 83 are up-converted to the customary carrier frequency by a frequency converting circuit 84.

To summarize, in VTR 71 subsampling is performed after conversion of the chrominance signals C into color difference signals U and V, and the frequency response characteristic of the system from subsample circuit 73 to subsample circuit 81 is arranged to be a cosine roll-off. Accordingly, the frequency response characteristic of the entire recording and reproducing system with respect to chrominance signals C is a cosine roll-off.

In particular, the passbands of the low pass filters 76 and 78 are arranged to be wide so as not to affect the frequency response of the recording and reproducing system as a whole with respect to the chrominance signal band.

Further, bandpass filters 74 and 78 are interposed, respectively, between subsampling circuit 73 and chrominance signal processing circuit 75 and between reproduced chrominance signal processing circuit 79 and subsampling circuit 81 and are arranged to correct the frequency response characteristic of the electromagnetic conversion system and provide the required cosine roll-off characteristic for the recording and reproducing system as a whole.

Figure 18:
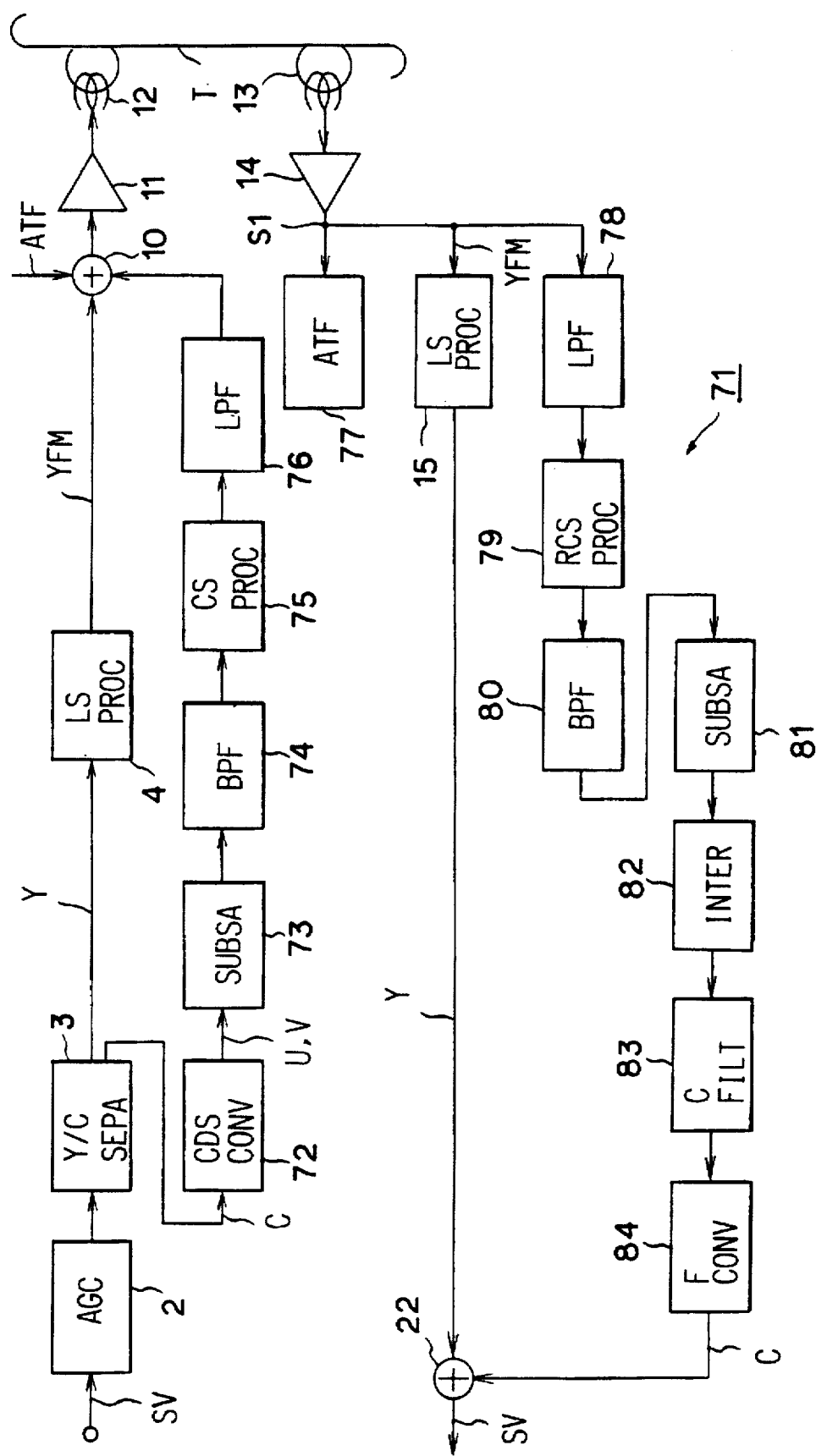
FIG. 18 is a block diagram of a video tape recorder according to a further embodiment of the present invention.

With the circuitry of FIG. 18, chrominance signals C are converted into color difference signals U and V and then band compression is performed and the overall system has a cosine roll-off frequency response characteristic that is achieved by correcting the frequency characteristic of the electromagnetic conversion system. Thus, chrominance signals C can be recorded with subsampling and then reproduced with an improved picture quality.

Figure 19:
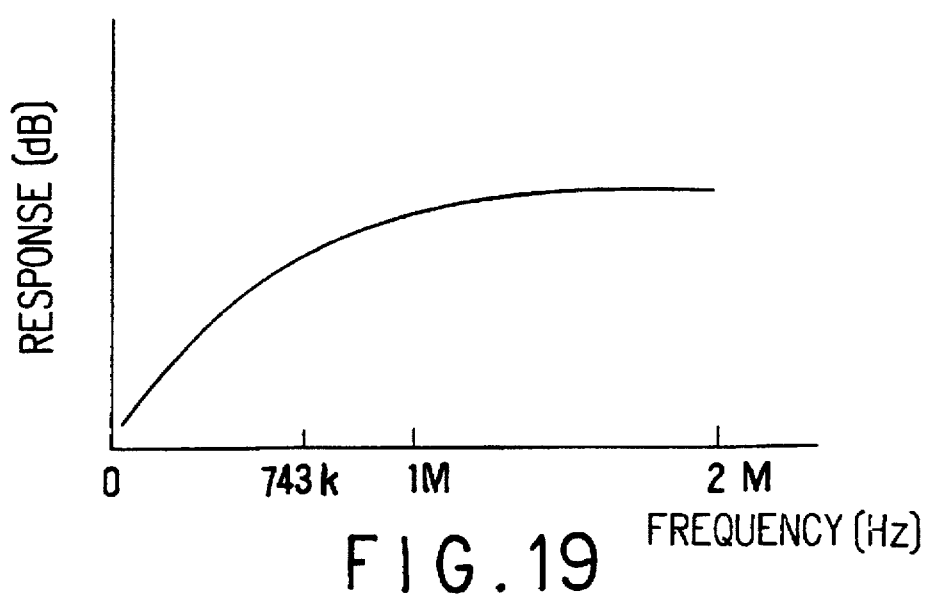
FIG. 19 is a graph of a frequency response characteristic curve for a VTR's electromagnetic conversion system to be referred to in explaining "scatter" in the electromagnetic conversion system.

As noted above, in accordance with the present invention, recording and reproducing of band-compressed down-converted chrominance signals is performed with correction of system frequency characteristics in order to compensate for the frequency characteristics of the magnetic head and the magnetic recording medium. The frequency characteristic of the entire system is arranged to be a cosine roll-off characteristic, so that the band-compressed chrominance signals can be properly recorded and reproduced with subsampling, resulting in an improved color picture. It should be noted, however, that the frequency characteristic of the electromagnetic conversion system varies with different tape transport speeds and different types of magnetic tape. In particular, as shown in FIG. 19, the frequency response of the electromagnetic conversion system in general declines at 6 dB per octave on the low frequency side, but this characteristic is subject to variation in the low-frequency band in which the chrominance signals are recorded (i.e. the band around 743 kHz).

In the conventional VTR 1 shown in FIG. 1, chrominance signals are extracted through a trap filter which suppresses the frequency modulated audio signals, and which has the response characteristic shown in FIG. 20. Combining the characteristics of the electromagnetic conversion system shown on FIG. 19 and of the trap filter shown on FIG. 20 results in the combined frequency characteristic shown in FIG. 21. However, since the characteristic shown in FIG. 19 is subject to variation with changes in tape transport speed, type of tape, etc., it follows that the overall characteristic shown in FIG. 21 also is subject to variation.

Variations in the electromagnetic conversion system as found in test measurements are shown in FIG. 22, in which curve L11 shows the system characteristic when signals on a metal magnetic tape are reproduced after recording at a standard tape transport speed, curve L12 shows the system characteristic when signals on a metal tape are reproduced after recording at the transport speed for extended recording, and curve L13 shows the characteristic when signals on a standard (i.e., not metal) tape are reproduced after recording at the standard transport speed. It should be noted that still a different characteristic is found (although not shown in FIG. 22) when signals on a standard tape are reproduced after recording at the transport speed for extended recording. It can be seen from FIG. 22 that the frequency characteristic of the electromagnetic conversion system varies with both tape transport recording speed and type of tape. Further, there is a different characteristic when evaporated metal tape, versus coated metal tape, is used. Moreover, the frequency characteristic is also affected by factors related to the magnetic heads, such as head wear.

If the change in the frequency characteristic is as large as about 1 dB, then the Nyquist theorem is not satisfied during subsampling, which results in significant deterioration in quality of the reproduced picture.

Figure 23:
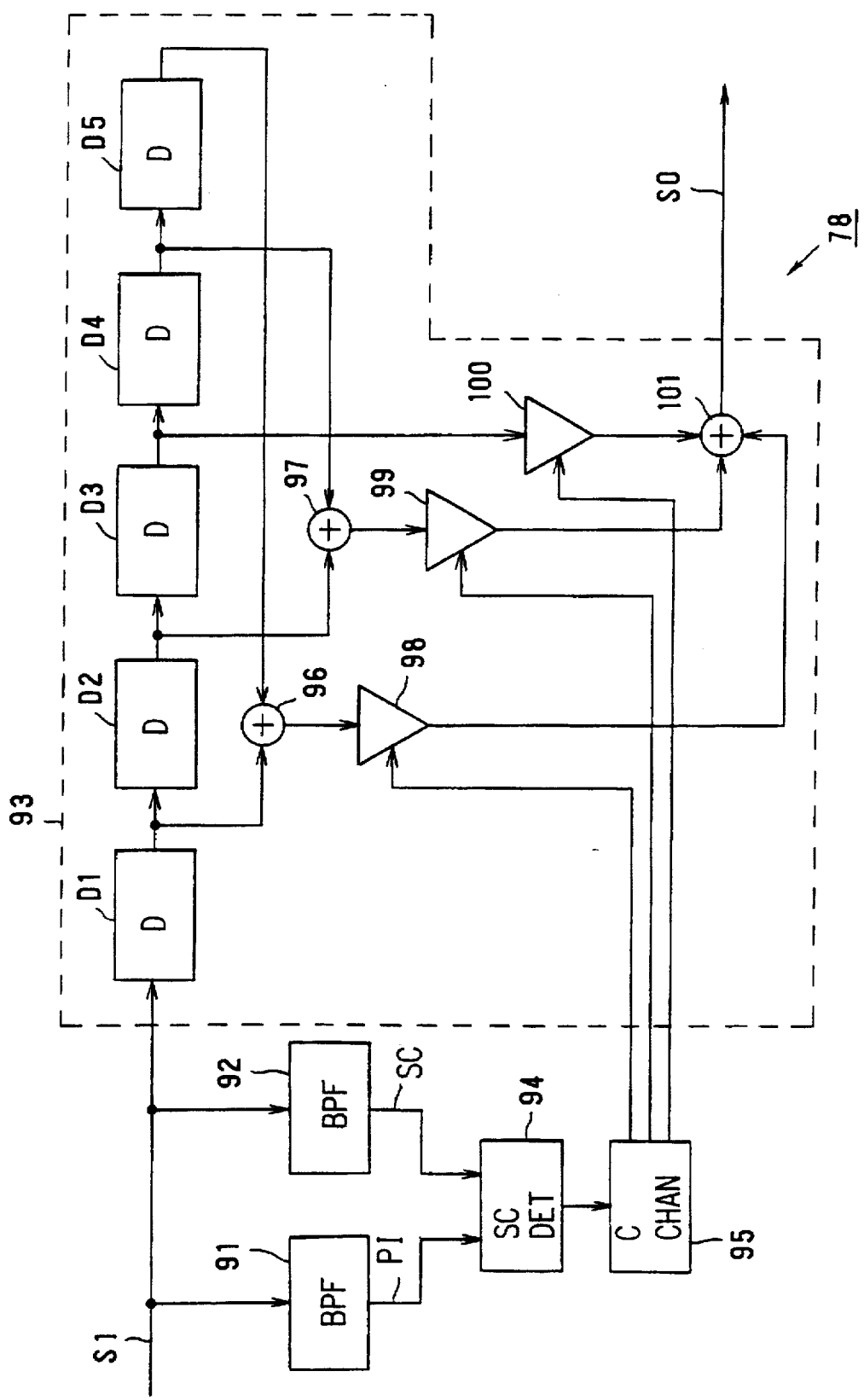
FIG. 23 is a block diagram of a low-pass filter included in the VTR of FIG. 18.

For this reason, the VTR 71 according to the embodiment shown in FIG. 18 includes a low-pass filter 78 which is able to correct variation or "scatter" in the frequency response characteristic of the electromagnetic conversion system. Details of LPF 78 will be described with reference to FIG. 23, in which the amplified signal S1 output by reproducing amplifier 14 is shown to be simultaneously provided to bandpass filters (BPF) 91 and 92 and to a finite impulse response (FIR) filter 93.

BPF 91 extracts a predetermined pilot signal PI which is one of four kinds of tracking control pilot signals ATF that are present in reproduced signal S1. BPF 92 separates the 743 kHz carrier signal SC from the reproduced signal S1. The signals PI and SC are respectively provided by BPF 91 and BPF 92 to a signal level detection circuit 94, which detects the levels of these signals and outputs a signal reflecting the result of the detection to a coefficient change over circuit 95.

On the basis of the signal output from detection circuit 94, coefficient change over circuit 95 changes the amplitude of the gain provided by variable gain amplifiers that are part of LPF 78. As a result, the frequency characteristic of signal SO output by filter circuit 93 is maintained so as to match the desired frequency characteristic in spite of variations of the characteristic of the electromagnetic conversion system.

Figure 24:
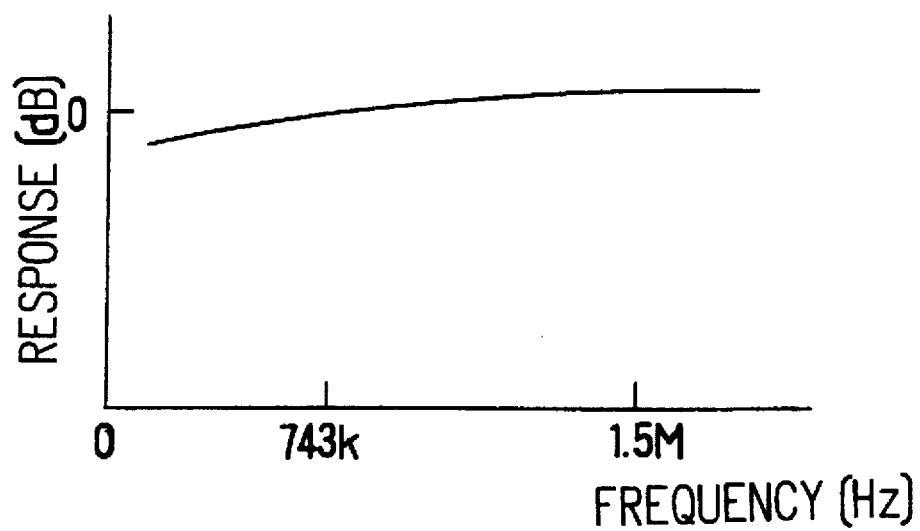
FIG. 24 is a graph of the amplitude characteristic of chrominance signals after correction by the low-pass filter of FIG. 23.

More specifically, FIR filter circuit 93 includes five delay circuits D1–D5, connected in series. The output signals of delay circuits D1 and D5 are provided to respective input terminals of an adder circuit 96, which outputs the sum of those signals to a variable amplifier 98. The output signals from delay circuits D2 and D4 are provided to respective inputs of an adder 97, which outputs the resulting sum to a variable amplifier 99. The output of delay circuit D3 is provided directly to a variable amplifier 100. The signals respectively received by amplifiers 98, 99 and 100 are weighted by the amplifiers in accordance with signals output by coefficient changeover circuit 95. The signals output by amplifiers 98, 99 and 100 are provided to respective inputs of an adder 101 which outputs the resulting sum as the output signal SO. The respective weights provided by amplifiers 98, 99 and 100 are adjusted by the signals output by coefficient changeover circuit 95 so that a predetermined ratio of the levels of pilot signal PI and carrier signal SC is maintained. In this way, the frequency characteristic of VTR 71 with respect to chrominance signals is corrected to the characteristic shown in FIG. 24.

With this correction in the characteristic of the electromagnetic conversion system, bandpass filters 91 and 92 provide for the frequency characteristic of the recording and reproducing system to be the desired cosine roll-off with respect to chrominance signals.

At the same time, BPF 74 (FIG. 18) is arranged to compensate for the frequency characteristic of the electromagnetic conversion system on the low-frequency side and also is arranged in combination with BPF 80 so that the group delay characteristic becomes flat.

Also, in VTR 71, LPF 78 corrects for changes in the characteristic of the electromagnetic conversion system on the basis of pilot signal PI and carrier signal SC. In this way, the frequency characteristic with respect to the chrominance signal band can be maintained as the desired cosign roll-off, even when there are variations in the electromagnetic conversion system characteristic due to magnetic head wear or other factors. It thus becomes possible to obtain an improved picture quality while maintaining compatibility with the conventional VTR format.

It is to be noted that although the embodiments described above utilize magnetic tape for recording and reproduction, the invention is not so limited, but may also be applied to recording and reproduction using other magnetic recording media.

Moreover, although in the embodiment discussed above, scatter of the frequency characteristic of the electromagnetic conversion system was corrected on the basis of the ATF tracking control pilot signal and the subcarrier signal, the invention is not so limited, and, for example, correction of scatter in the electromagnetic conversion system could instead be performed on the basis of separately recorded reference signals that are specifically provided for correction of scatter.

Having described specific preferred embodiments of the present invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An apparatus for processing an input video signal that includes a chrominance signal and a luminance signal, comprising:

means for subsampling said chrominance signal including means for sampling said chrominance signal in accordance with an $f_{sc}/4$ sampling clock, where fsc is a color subcarrier frequency;

means for frequency modulating said luminance signal;

means for frequency converting the subsampled chrominance signal to a lower frequency band than that of the frequency-modulated luminance signal;

means for combining the frequency-modulated luminance signal and the frequency-converted subsampled chrominance signal to provide a combined signal; and means for recording said combined signal on a recording medium.

2. An apparatus according to claim 1; wherein said means for subsampling includes means for performing 2-field cycle offset-subsampling on said chrominance signal.

3. An apparatus according to claim 1; wherein said means for subsampling includes means for performing 4-field cycle offset-subsampling on said chrominance signal.

4. An apparatus according to claim 1; further comprising:

means for reproducing said recorded combined signal from said recording medium;

means for separating said frequency-converted chrominance signal from said reproduced combined signal;

converter means for converting said separated chrominance signal into a color difference signal; and means for interpolating said color difference signal.

5. In a system for recording and reproducing video signals, an apparatus for processing an input video signal that includes a chrominance signal and a luminance signal, comprising:

means for subsampling said chrominance signal;

means for frequency modulating said luminance signal;

means for frequency converting the subsampled chrominance signal to a lower frequency band than that of the frequency-modulated luminance signal;

means for combining the frequency-modulated luminance signal and the frequency-converted subsampled chrominance signal to provide a combined signal;

means for recording said combined signal on a recording medium;

means for reproducing said recorded frequency-converted chrominance signal from said recording medium; and means for equalizing the chrominance signal so that an overall chrominance frequency response characteristic of said system for recording and reproducing video signals is a cosine roll-off frequency response characteristic.

6. A system according to claim 5; wherein said means for equalizing includes means for detecting a reference signal level reproduced from said recording medium, and means for equalizing the reproduced chrominance signal on the basis of the detected reference signal level.

7. A system according to claim 5; wherein said means for reproducing includes:

means for reproducing said recorded combined signal from said recording medium;

means for separating said frequency-converted chrominance signal from said reproduced combined signal;

means for converting said separated chrominance signal into a color difference signal; and means for interpolating said color difference signal.

8. A system according to claim 7; wherein said means for separating includes:

variable low-pass filter means for low-pass filtering said reproduced combined signal in accordance with a variable amplitude characteristic to provide said separated chrominance signal;

means for separating at least one reference signal from said reproduced combined signal;

means for detecting a level of said separated reference signal and outputting a detection signal based on said detected level of said separated reference signal; and means for varying said variable amplitude characteristic on the basis of said detection signal so that an overall chrominance frequency response characteristic of said system for recording and reproducing is a cosine roll-off response characteristic.

9. A system according to claim 8; wherein said means for separating at least one reference signal includes means for separating a tracking control pilot signal and a carrier signal from said reproduced combined signal; and said means for detecting includes means for detecting respective levels of said separated tracking control pilot signal and said carrier signal.

* * * * *